Sept. 5, 1967     J. C. LOWE ET AL     3,340,124
METHOD AND APPARATUS FOR COATING PAPER
Filed July 18, 1963     2 Sheets-Sheet 2

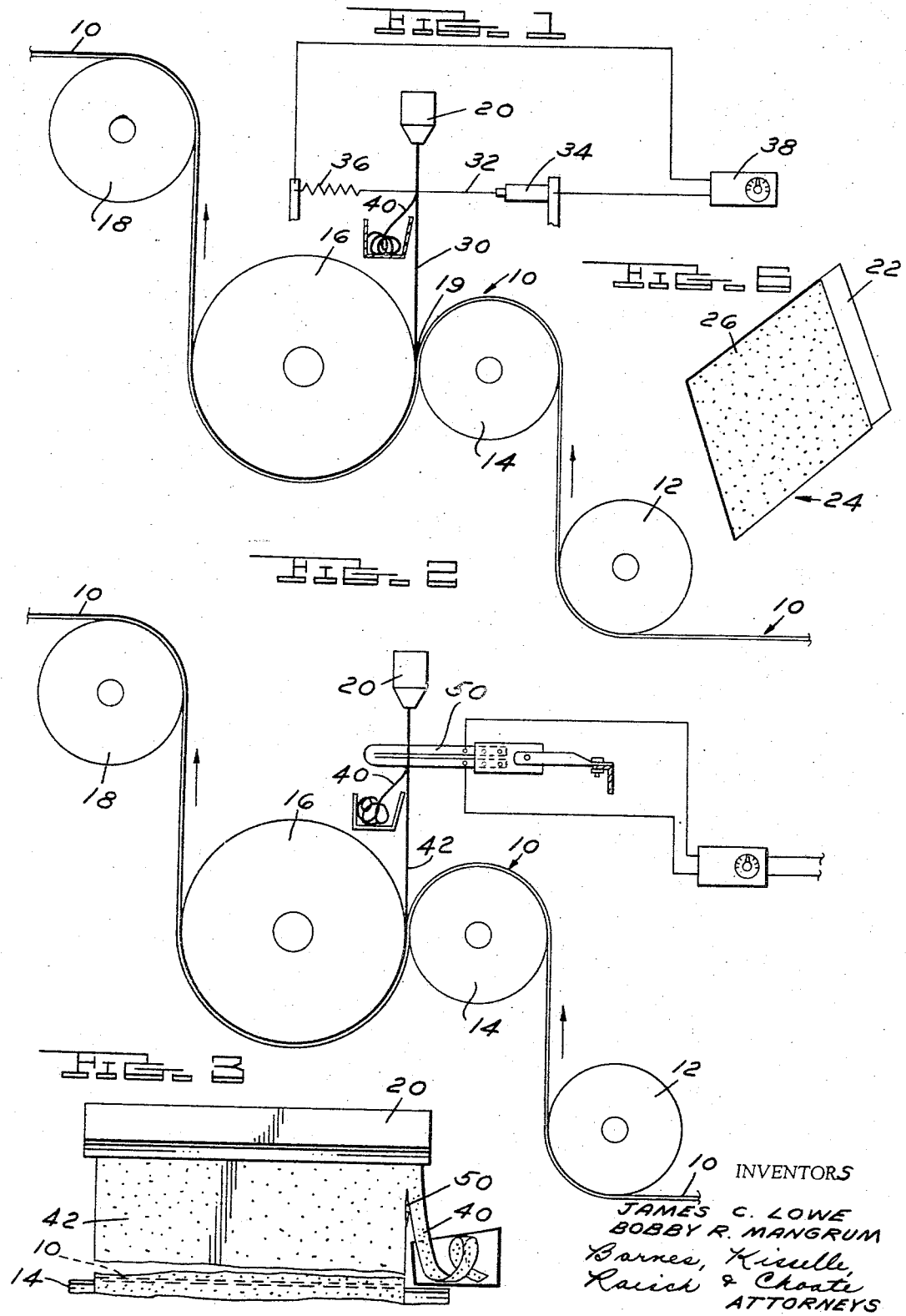

INVENTORS
JAMES C. LOWE
BOBBY R. MANGRUM
BY
Barnes, Kisselle, Raisch & Choate
ATTORNEYS 3,340,124
METHOD AND APPARATUS FOR COATING PAPER
James C. Lowe and Bobby R. Mangrum, Monroe, La., assignors to Adams Paper Converting Company, Monroe, La., a corporation of Michigan
Filed July 18, 1963, Ser. No. 295,979
8 Claims. (Cl. 156—244)

This invention relates to a method and apparatus for coating paper.

It is an object of the present invention to provide a method including a series of steps which results in the coating of paper with a plastic coating to give it additional strength and moisture resistance, while maintaining an uncoated portion along the edge of the paper sometimes referred to as a selvage edge. This uncoated edge has many uses, but one particular use relates to the fastening of one sheet to another with the use of glue in the making of bags. For example, it may be desirable to have an uncoated edge which can be suitably glued to another similar edge.

In the manufacture of plastic coated paper, however, the coating is generally extruded adjacent the moving sheet of paper and since in some instances the entire sheet is to be coated, the extrusion die will have a width equal to the sheet of paper. Also, the width of any selvage edge may vary with different batches of paper depending on the purpose for which the paper is made. Thus, it is desirable to have a method and apparatus for utilizing a full-width die to coat paper which is to have a selvage edge.

The present invention contemplates a simple and effective way of providing a means of accomplishing this coating without waste of material and with accurate delineation along the edge of the uncoated paper.

Another object of the invention is the provision of a selvage edge which has an even coating of plastic at the delineation. For some reason, the edge of an extruded sheet of a plastic laminate is sometimes thickened into a bead. Direct application of this edge in a location on a sheet of paper, spaced from the edge thereof, is apt to produce a noticeable ridge. The present invention contemplates a method of controlled coating wherein this ridge is avoided while leaving the paper edge clean with a good transition to the coated portion.

Briefly, the objects of the invention are accomplished by severing a strip of the coating material and removing it from contact with the paper which is being otherwise coated so that an uncoated edge remains. This may be accomplished in two related devices illustrated diagrammatically in the drawings in which:

FIGURE 1 is a diagrammatic side view of one system of coating.

FIGURE 2 is a modified view showing a modified type of plastic cutting device.

FIGURE 3 is a view of the extruded sheet of plastic material being severed along its edge.

Figure 4:
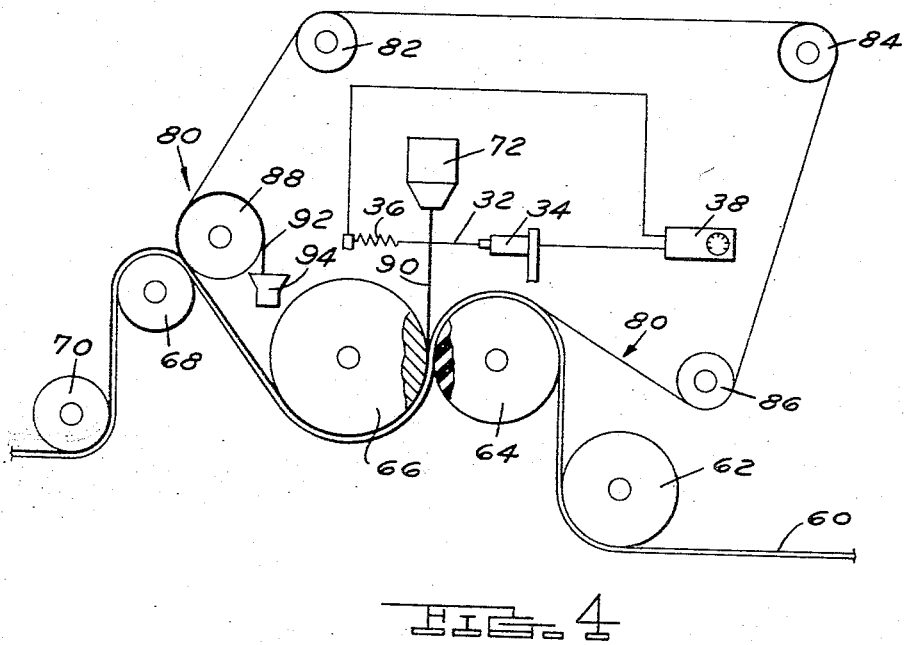
FIGURE 4 is a diagrammatic view of a modified apparatus for paper coating with a protected edge.
Figure 5:
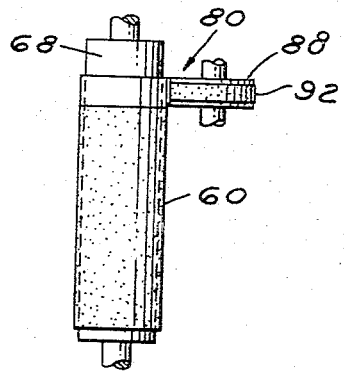
FIGURE 5 is a longitudinal view of one of the rollers of FIGURE 4 illustrating the manner in which the severed edge is maintained in separation from the paper.

FIGURE 6, a view of a sheet of completed paper.

Referring to the drawings:

In FIGURE 1, a sheet 10 of paper from a suitable supply is shown passing over a guide roll 12 to a rubber roll 14 which is positioned directly adjacent a large chrome-plated pressure roll 16. The paper passes over roll 12 and under roll 14 and through the pressure area between rolls 14 and 16 from which it passes to a delivery roll 18. Directly above the cleavage line 19 between rolls 14 and 16 is an elongate extruder nozzle 20 from which can be extruded a thin sheet of plastic such as polyethylene, for example. This sheet can be the exact width of the paper strip 10 if the entire surface of the paper is to be covered. When a selvage edge is desired, such as shown at 22 (FIGURE 6) on a sheet 24 coated with a plastic 26, then it is essential that a portion of the extruded sheet 30 coming from the extruder 20 be removed. This is accomplished in FIGURE 1 by a finely dimensioned funicular element in the form of a strand of resistance wire 32 which can be a nickel chrome wire supported at one end by a porcelain insulator 34 and connected at the other end to a resistor element 36 which can be of an adjustable design.

A suitable 110 volt AC oscillating transformer 38 is provided to supply current in such a way that the nickel chrome wire will become extremely hot to the point that it is glowing red. This wire will then cut off the edge of the plastic material 20 in a clean slice and, as shown in FIGURE 3, the edge 40 can be stripped away so that only the balance of the polyethylene sheet 42 reaches the paper 10. This portion 42 is laminated onto the paper by reason of the pressure of rolls 10 and 16, leaving one edge or margin of the paper 22, as shown in FIGURE 6, free of any coating.

In FIGURE 2, a similar apparatus is shown diagrammatically but in this case a stainless steel U-shaped blade 50 is used in an electrical circuit wherein it is heated again by electrical resistance. This blade 50, sharpened at each edge, also cuts away a strip 40 to relieve a portion of the paper from a coating leaving the selvage edge clear.

In FIGURE 4, a modified apparatus is shown diagrammatically. In some cases, the portion of the extruded plastic sheet, which is being cut away is so soft that it is difficult to entrain it into a refuse channel. In FIGURE 4, a system is shown wherein this strip can follow the same path as the body of the strip but be separated from the paper during the laminating phase of the process.

In FIGURE 4, the paper 60 travels around a roll 62 and over a rubber pressure roll 16 operating in proximity to a chrome-plated pressure roll 66. The paper passes between rolls 64 and 66 to a direction changing roll 68 and a departure roll 70. An extruder nozzle 72 above the pressure rolls 64–66 is again associated with a cutting device with a hot wire 32 as described in connection with FIGURE 1. In this case, however, an interply belt 80 is guided by cornering rolls 82, 84 and 86 to the roll 64, this interply belt passing between rolls 64 and 66 and around a roll 88 back to the roll 82. This belt is preferably formed of a material such as a relatively thin fiber glass; and as the plastic sheet 90 falls from the extruder nozzle 72, it is cut as previously described, but the cut strip of plastic 92 falls onto the belt 80 rather than onto the paper 60 and it follows this belt until the paper moves away around the roller 68, the cup strip 92 being carried around the roller 88 into a receiver horn 94.

Thus, the selvage edge of the paper is protected throughout the laminating stage by the fiber glass belt and the strip 92 has a chance to cool so that it can be readily handled into the receiver 94. In this way, the selvage edge of the paper is clearly delineated and completely clear of coating while the cut-away strip 92 can pass safely away from the finished product to a point where it can be salvaged. Also, the thickened bead which sometimes forms at the edge of an extruded sheet is removed to create a smooth transition to the coated area which permits the paper to be rolled without noticeable bulging at the transition line.

We claim:
1. A method of coating paper to leave a delineated uncoated edge which comprises:
   (a) passing a sheet of paper from a supply roll between two pressure rolls,
   (b) extruding into the cleavage between said pressure rolls a sheet of plastic having a width substantially that of the paper,
   (c) cutting an edge from said extruded sheet to render said extruded sheet of less width than the paper sheet, and
   (d) removing said edge prior to the time that the balance of the extruded sheet reaches the cleavage area of the pressure rolls in contact with the paper.

2. A method of coating paper with a plastic sheet with a clearly delineated uncoated edge which comprises:
   (a) passing a roll of paper from a supply between two pressure rolls,
   (b) extruding a sheet of plastic material adjacent said pressure rolls in a direction where it can merge and laminate with said paper as it passes between said rolls,
   (c) removing an edge of said extruded sheet from the main body of the sheet to render the extruded sheet of less width than the paper sheet, and
   (d) directing said removed edge in a manner to prevent contact with said paper as it moves between said pressure rolls.

3. A method of coating paper with a plastic sheet with a clearly delineated uncoated edge which comprises:
   (a) passing a roll of paper from a supply between two pressure rolls,
   (b) extruding a sheet of plastic material adjacent said pressure rolls in a direction where it can merge with said paper as it passes between said rolls,
   (c) removing an edge of said extruded sheet from the main body of the sheet, and
   (d) directing said removed edge in a manner to prevent contact with said paper as it moves between said pressure rolls by interposing a continuously moving strip of material between said paper and said removed edge as the extruded sheet moves between said pressure rolls.

4. An apparatus for coating paper with an extruded sheet of plastic to maintain a clearly delineated uncoated edge which comprises:
   (a) a pair of pressure rolls located in proximity to each other to receive a supply of uncoated paper,
   (b) means for extruding a sheet of plastic having substantially the width of said paper, said means being positioned above a cleavage area between said rolls,
   (a) a severing knife positioned between said extruding means and said rolls to separate an edge of said extruded sheet from the main body of said sheet, and
   (d) means for directing said edge to prevent contact with one edge of said paper as it moves between said pressure rolls.

5. A device as defined in claim 4 in which said severing knife comprises:
   (a) a strand of electrical resistance material positioned across the path of extruded plastic, and
   (b) means for heating said resistance material to a sufficient temperature to cut said plastic material.

6. A device as defined in claim 4 in which said severing knife comprises:
   (a) a U-shaped blade having a sharpened edge positioned across the path of said plastic sheet, and
   (b) means for placing said blade in a resistance circuit to heat it to a temperature to sever said plastic sheet as the sheet moves past said blade.

7. An apparatus for coating paper with an extruded sheet of plastic to maintain a clearly delineated uncoated edge which comprises:
   (a) a pair of pressure rolls located in proximity to each other to receive a supply of uncoated paper,
   (b) means for extruding a sheet of plastic having substantially the width of said paper, said means being positioned above a cleavage area between said rolls,
   (c) a severing knife positioned between said extruding means and said rolls to separate an edge of said extruded sheet from the main body of said sheet, and
   (d) means for preventing the adhesion of said severed edge to said paper which comprises an interply belt positioned to move between said pressure rolls to separate said severed edge from said paper throughout the pressure area and to carry said severed edge away from said paper to leave a clearly delineated uncoated margin on said paper.

8. An apparatus for coating a sheet of paper with a sheet of plastic in a manner to leave an uncoated clearly delineated margin on said paper which comprises:
   (a) a pair of pressure rolls for laminating said paper and said coating passing into the cleavage therebetween,
   (b) guide rolls for directing a supply of paper in a path between said pressure rolls,
   (c) an interply belt for moving in the same path between said pressure rolls at one end thereof,
   (d) means for guiding said interply belt in said path and away from the path of said paper at a predetermined point beyond said pressure rolls,
   (e) an extrusion means positioned above said pressure rolls for extruding a sheet of material to be laminated to said paper to the cleavage between said pressure rolls, and
   (f) means between said extrusion means and said pressure rolls for severing an edge of said extruded sheet from the main body of said sheet, said interply belt serving to insulate said severed edge from said sheet of paper as it passes between said pressure rolls and serving to guide said severed edge away from said sheet of paper as it leaves said pressure rolls.

References Cited

UNITED STATES PATENTS

| | | | |
|---|---|---|---|
| 2,944,586 | 7/1960 | Yanulis | 156—498 |
| 2,990,875 | 7/1961 | Samuels et al. | 156—271 |
| 3,165,433 | 1/1965 | Markowicz | 156—271 |

EARL M. BERGERT, *Primary Examiner.*

T. R. SAVOIE, *Assistant Examiner.*